(12) United States Patent
Gebreselasie et al.

(10) Patent No.: US 7,876,547 B2
(45) Date of Patent: Jan. 25, 2011

(54) VERTICAL PARALLEL PLATE CAPACITOR STRUCTURES

(75) Inventors: Ephrem G. Gebreselasie, Shelburne, VT (US); Zhong-Xiang He, Essex Junction, VT (US); Steven H. Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/755,502

(22) Filed: May 30, 2007

(65) Prior Publication Data

US 2008/0297975 A1 Dec. 4, 2008

(51) Int. Cl.
  *H01G 4/008* (2006.01)
  *H01G 4/005* (2006.01)
  *H01G 4/38* (2006.01)

(52) U.S. Cl. .................. 361/303; 361/305; 361/328; 361/329; 257/306; 257/307; 257/595; 257/E27.048

(58) Field of Classification Search .................. 257/306, 257/311, 532, 758, E29.343, E23.142, E23.144
See application file for complete search history.

(56) References Cited

U.S. PATENT DOCUMENTS

| | | | | |
|---|---|---|---|---|
| 6,094,335 | A * | 7/2000 | Early | 361/303 |
| 6,423,584 | B2 * | 7/2002 | Takahashi et al. | 438/152 |
| 6,704,179 | B2 | 3/2004 | Voldman | |
| 6,765,779 | B2 * | 7/2004 | Stevenson et al. | 361/302 |
| 7,002,217 | B2 | 2/2006 | Hollingsworth | |
| 7,013,436 | B1 | 3/2006 | Morton et al. | |
| 7,064,090 | B2 | 6/2006 | Minami et al. | |
| 7,134,099 | B2 | 11/2006 | Collins et al. | |
| 7,250,681 | B2 | 7/2007 | Matsunaga | |
| 7,350,160 | B2 | 3/2008 | Perez et al. | |
| 7,401,311 | B2 | 7/2008 | Voldman | |
| 7,453,136 | B2 | 11/2008 | Hakkarainen et al. | |
| 7,518,850 | B2 * | 4/2009 | Kim et al. | 361/328 |
| 7,566,956 | B2 | 7/2009 | Mitarai et al. | |
| 2003/0147187 | A1 | 8/2003 | Voldman | |
| 2004/0268284 | A1 | 12/2004 | Perez et al. | |
| 2005/0032298 | A1 * | 2/2005 | Minami et al. | 438/237 |
| 2005/0102644 | A1 | 5/2005 | Collins et al. | |
| 2005/0156281 | A1 | 7/2005 | Eshun et al. | |
| 2005/0275070 | A1 * | 12/2005 | Hollingsworth | 257/659 |

(Continued)

OTHER PUBLICATIONS

Steven H. Voldman "Methodology for Automated Design of Vertical Parallel Plate Capacitors", U.S. Appl. No. 11/837,945, filed Aug. 13, 2007.

Plouchart, et al., "Application of an SOI 0.12-um CMOS Technology to SoCs with Low-Power and High-Frequency Circuits", IBM J. Res. & Dev. vol. 47 No. 5/6, Sep./Nov. 2003 pp. 611-629.

(Continued)

*Primary Examiner*—Matthew E Warren
*Assistant Examiner*—David Spalla
(74) *Attorney, Agent, or Firm*—Wood, Herron & Evans, LLP

(57) ABSTRACT

Vertical parallel plate (VPP) capacitor structures that utilize different spacings between conductive plates in different levels of the capacitor stack. The non-even spacings of the conductive plates in the capacitor stack decrease the susceptibility of the capacitor stack of the VPP capacitor to ESD-promoted failures. The non-even spacings may be material specific in that, for example, the spacings between adjacent conductive plates in different levels of the capacitor stack may be chosen based upon material failure mechanisms for plates containing different materials.

6 Claims, 1 Drawing Sheet

U.S. PATENT DOCUMENTS

| | | |
|---|---|---|
| 2006/0166426 A1 | 7/2006 | Voldman |
| 2006/0289955 A1* | 12/2006 | Mitarai et al. ............... 257/415 |
| 2007/0018327 A1* | 1/2007 | Fujiwara et al. ............. 257/758 |
| 2007/0029676 A1* | 2/2007 | Takaura et al. .............. 257/758 |
| 2008/0099880 A1 | 5/2008 | Cho et al. |
| 2008/0173981 A1 | 7/2008 | Chinthakindi et al. |
| 2008/0270955 A1 | 10/2008 | Isakson et al. |
| 2009/0102016 A1 | 4/2009 | Gebreselasie et al. |
| 2009/0235209 A1 | 9/2009 | Sawicki et al. |

OTHER PUBLICATIONS

US Patent and Trademark Office, Office Action issued in related U.S. Appl. No. 11/837,945 dated May 22, 2009.

Kim et al., 3-Dimensional Vertical Parallel Plate Capacitors in an SO1 CMOS Technology for Integrated RF Circuit, 2003, IEEE, pp. 29-32.

Theng et al., Clamp Placement Optimization in Full-Chip ESD (Electro-Static-Discharge) Design, 2006, IEMT, pp. 202-206.

USPTO, Office Action issued in related U.S. Appl. No. 11/876,402 dated May 14, 2010.

* cited by examiner

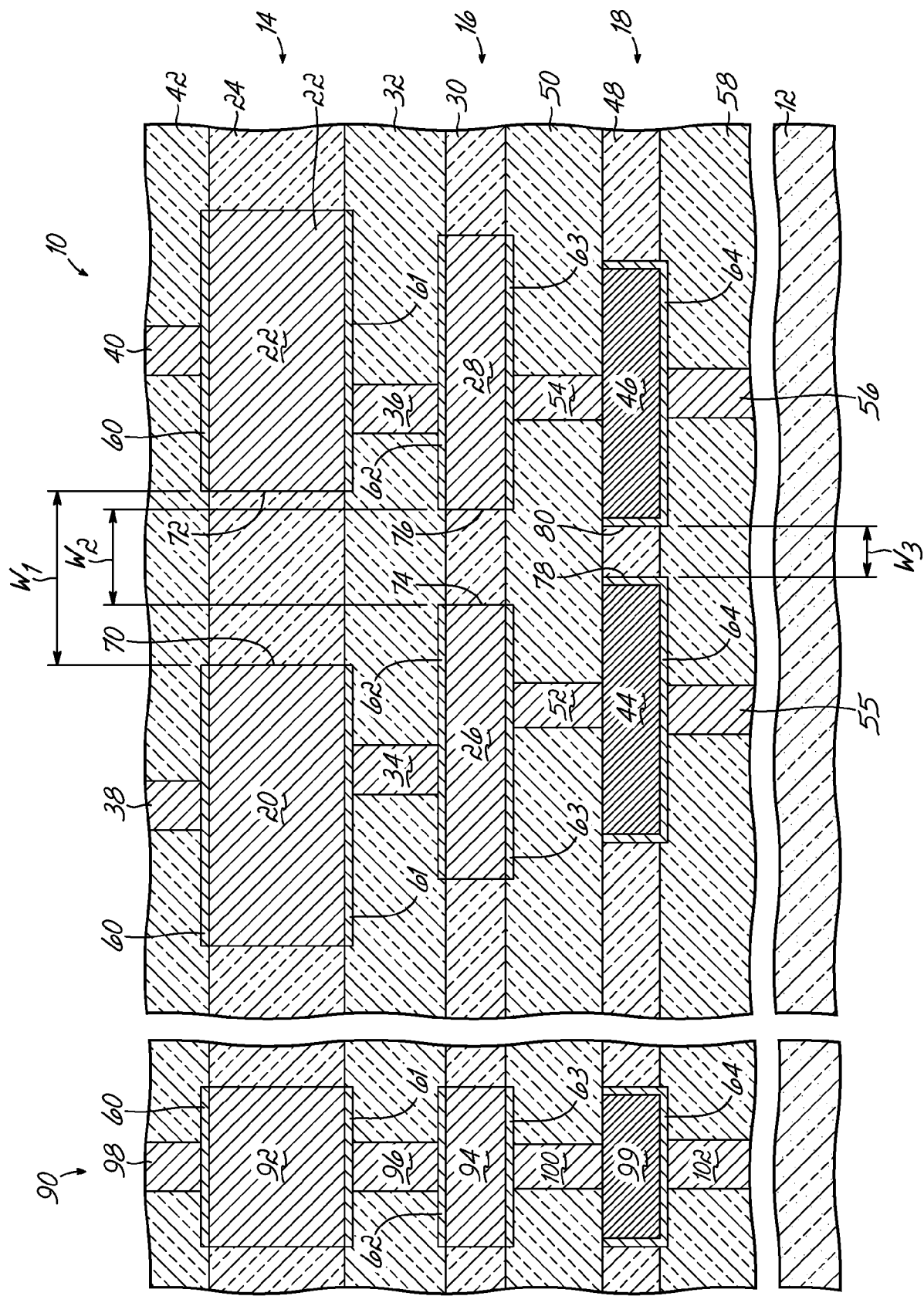

VERTICAL PARALLEL PLATE CAPACITOR STRUCTURES

FIELD OF THE INVENTION

The invention relates generally to integrated circuit fabrication and, in particular, to vertical parallel plate capacitor structures for use in integrated circuits.

BACKGROUND OF THE INVENTION

Capacitors are passive elements that are extensively used in integrated circuits for storing an electrical charge. Capacitors, which include conductive plates separated by an insulator, have a capacitance contingent upon a number of parameters, such as plate area, intra-plate spacing, and the insulator's dielectric constant. Capacitors are found in filters, analog-to-digital converters, memory devices, control applications, and many other types of integrated circuits, and may be used for electrostatic discharge (ESD) protection.

One common type of capacitor found in integrated circuits is a vertical parallel plate capacitor (VPP). In particular, VPP capacitors may be integrated into an integrated circuit during back end of line (BEOL) processing forming the stacked metallization layers of multi-level interconnect structures or otherwise formed using BEOL process techniques and materials. Copper metallurgy, which has a higher conductivity than aluminum metallurgy, is used in lower metallization layers of the interconnect structure to increase signal propagation speed. However, aluminum metallurgy is preferred in upper metallization layers of the interconnect structure because of the recognized advantages of aluminum metallurgy over copper metallurgy for chip and package solder and wire bonding connection pads.

Consequently, the plates of VPP capacitors may have either an aluminum metallurgy or a copper metallurgy. As an artifact of the BEOL processing, the sidewalls and bottom of each copper plate is lined by a barrier layer. In contrast, aluminum plates are clad on only the top and bottom by barrier layers. Under ESD testing and during ESD events in an operating device, aluminum plates have been demonstrated to be more prone to failure than copper plates. Generally, ESD-promoted failure may occur by crack initiation and propagation in the dielectric material bordering the plate followed by melting and flow of the aluminum or copper from the plate into the crack. Because of the confinement by refractory metal cladding on the top and bottom surfaces, aluminum plates fail by a lateral cracking mechanism. In contrast, copper plates are confined by refractory metal cladding on the sidewalls and bottom surface and, consequently, fail in a vertical direction.

VPP capacitors are needed that exhibit increased resistance to ESD-promoted failures either during testing or during device operation.

SUMMARY OF THE INVENTION

Embodiments of the invention are generally directed to vertical parallel plate (VPP) capacitor structures that utilize different spacings between conductive plates in different levels of the capacitor stack. The non-even spacings of the conductive plates in the capacitor stack contribute to a high electrostatic discharge (ESD) robustness. The non-even spacings may be material specific. For example, the spacings between conductive plates in different levels of the capacitor stack may be chosen based upon material failure mechanisms for conductive plates of different materials. As a more specific example, the capacitor stack of the VPP capacitor may include copper plates with minimum spacings between copper plates and aluminum plates with wider spacings between aluminum plates. The wider spacing for the aluminum plates may alleviate ESD-promoted failures of the VPP capacitor structures fabricated from aluminum and copper using back end of line (BEOL)-type processes.

In one embodiment, the capacitor structure comprises a first plurality of conductive plates and a second plurality of conductive plates having an overlying relationship with the first plurality of conductive plates. The first plurality of conductive plates are spaced apart by a first distance. The second plurality of conductive plates spaced apart are by a second distance different than the first distance.

BRIEF DESCRIPTION OF THE DRAWINGS

The FIGURE is cross-sectional view of portions of a substrate carrying a vertical parallel plate capacitor structure constructed in accordance with an embodiment of the invention.

DETAILED DESCRIPTION

With reference to the FIGURE, a vertical parallel plate (VPP) capacitor structure, generally indicated by reference numeral 10, is carried on a substrate 12. Substrate 12 may include various circuits and/or devices (not shown) formed thereon and/or therein with features that are to be contacted. Substrate 12 may be a semiconductor wafer composed of a semiconductor material including, but not limited to, silicon (Si), silicon germanium (SiGe), a silicon-on-insulator (SOI) layer, and other like Si-containing semiconductor materials. Alternatively, substrate 12 may comprise a ceramic substrate, such as a quartz wafer or an AlTiC ($Al_2O_3$—TiC) wafer, or another type of substrate known to a person having ordinary skill in the art.

The VPP capacitor structure 10 includes a capacitor stack defined by a plurality of metallization layers 14, 16, 18 that are formed by back end of line (BEOL) process techniques. Metallization layer 14 includes a plurality of conductive strips or plates, of which conductive plates 20, 22 are representative, that are formed in an insulating layer 24. Similarly, the underlying metallization layer 16, which is disposed between metallization layer 14 and metallization layer 18, includes a plurality of conductive strips or plates, of which conductive plates 26, 28 are representative, that are formed in an insulating layer 30. An insulating layer 32 is disposed between conductive plates 20, 22 and 26, 28. Conductive plugs, such as the representative conductive plugs 34, 36, fill vias defined in insulating layer 32. Conductive plug 34 supplies a vertical connection and electrical and physical coupling between conductive plate 20 and conductive plate 26. Conductive plug 36 supplies a vertical connection and electrical and physical coupling between conductive plate 22 and conductive plate 28. Optional additional plugs (not shown) constructed like plugs 34, 36 may be provided to establish multiple points of electrical and physical coupling between conductive plates 20, 22 and conductive plates 26, 28, respectively.

In certain embodiments, one or more upper metallization layers (not shown) may be disposed in an overlying relationship with metallization layer 14. Conductive plugs, such as the representative conductive plugs 38, 40, fill vias defined in an insulating layer 42 overlying insulating layer 24 and conductive plates 20, 22. Conductive plug 38 may supply a vertical connection and electrical and physical coupling between conductive plate 20 and a conductive plate in an overlying metallization layer. Conductive plug 40 may supply a vertical connection and electrical and physical coupling between conductive plate 22 and a conductive plate in the overlying metallization layer. Optional additional plugs (not shown) constructed like plugs 38, 40 may be provided to establish multiple points of electrical and physical coupling between conductive plates 20, 22 with any overlying conductive plates.

Metallization layer 18 is disposed below metallization layer 16 and, therefore, between metallization layer 14 and the substrate 12. Metallization layer 18 includes a plurality of conductive strips or plates, of which conductive plates 44, 46 are representative, that are formed in an insulating layer 48. An insulating layer 50 is disposed between the conductive plates 26, 28 in metallization layer 16 and conductive plates 44, 46 and, therefore, between insulating layers 30 and 48. Conductive plugs, such as the representative conductive plugs 52, 54, fill vias defined in insulating layer 50 to supply respective vertical connections and electrical and physical couplings between conductive plates 26, 28 and conductive plates 44, 46, respectively. Optional additional plugs (not shown) constructed like plugs 52, 54 may be provided to establish multiple points of electrical and physical coupling between conductive plates 26, 28 and conductive plates 44, 46, respectively.

In certain embodiments, additional lower metallization layers (not shown) may be disposed between metallization layer 16 and substrate 12. Conductive plugs, such as the representative conductive plugs 55, 56, fill vias defined in an insulating layer 58 underlying insulating layer 48 and conductive plates 44, 46. Conductive plug 55 may supply a vertical connection and physical coupling between conductive plate 44 and a conductive plate in an underlying metallization layer. Conductive plug 56 may supply a vertical connection and physical coupling between conductive plate 46 and a conductive plate in the underlying metallization layer. Optional additional plugs (not shown) constructed like plugs 55, 56 may be provided to establish multiple points of electrical and physical coupling between conductive plates 44, 46, respectively, and any underlying conducting plates.

The insulating layers 24, 32, 42, 48, 50, 58 may be deposited by a conventional technique, such as a chemical vapor deposition (CVD) process or a plasma enhanced CVD (PECVD) process, understood by a person having ordinary skill in the art. The insulating layers 24, 32, 42, 48, 50, 58 may comprise silicon dioxide, fluorine-doped silicon glass (FSG), combinations of these dielectric materials, and other dielectric materials recognized by a person having ordinary skill in the art.

Suitable materials for conductive plates 20, 22, 26, 28, 44, 46 of the VPP capacitor structure 10 and conductive plugs 34, 36, 38, 40, 52, 54, 55, 56 include, but are not limited to, copper (Cu), aluminum (Al), tungsten (W), alloys of these metals, and other similar metals. These materials may be deposited by conventional deposition processes including, but not limited to a CVD process and an electrochemical process like electroplating or electroless plating.

With continued reference to the FIGURE, the conductive plates 20, 22 in metallization layer 14 are clad on two sides (i.e., the upper and lower sides) by regions of barrier layers 60, 61, respectively. The lateral sides of the conductive plates 20, 22 are in direct physical contact with dielectric material in insulating layer 24. Similarly, the conductive plates 26, 28 in metallization layer 16 are clad on two sides by barrier layers 62, 63, respectively. The lateral sides of the conductive plates 26, 28 are in direct physical contact with dielectric material in insulating layer 30. In contrast, the conductive plates 44, 46 are clad on three sides by barrier layer 64 so that only one side (i.e., the upper side) is in direct physical contact with dielectric material in insulating layer 50.

Conductive plates 20, 22 may be formed using a standard lithography and subtractive etching process to pattern a metal stack deposited on insulating layer 32, after the conductive plugs 34, 36 are fabricated. The metal stack includes barrier layer 61, such as a bilayer of titanium and titanium nitride, a layer of a metal, such as aluminum, and barrier layer 62, such as another bilayer of titanium and titanium nitride. Conductive plates 20, 22 may be defined from the metal stack by applying a resist layer (not shown), patterning the resist layer, anisotropically etching the metal stack using, for example, a reactive ion etching (RIE) process, capable of producing substantially vertical sidewalls, and stripping residual resist from the conductive plates 20, 22 by, for example, plasma ashing or a chemical stripper. Insulating layer 24 is deposited as a gap fill material and polished to a substantially planar condition by, for example, a chemical mechanical polishing (CMP) process. Conductive plates 26, 28 are formed in insulating layer 30 by a similar procedure as the procedure forming conductive plates 20, 22.

Conductive plates 44, 46 may be formed in insulating layer 48 by a conventional single damascene process. After insulating layer 48 is deposited, troughs are formed in the insulating layer 48 using a conventional lithography and etching process. A resist layer (not shown) is applied to cover insulating layer 48, is exposed to impart a latent image pattern of the troughs, and is developed to transform the latent trench image pattern into a final image pattern with unmasked areas that expose insulating layer 24 at the future locations of the troughs. Troughs with substantially vertical sidewalls are defined in the unmasked area of insulating layer 48 with an etching process, such as plasma etching or RIE. After the etching process is concluded, residual resist is stripped from insulating layer 48 by, for example, plasma ashing or a chemical stripper.

In an alternative embodiment, the vias for conductive plugs 55, 56 and the troughs for conductive plates 44, 46 may comprise a dual-damascene pattern formed by a via-first, trough-last process sequence or a trough-first, via-last process sequence. The ability to perform dual damascene process steps regardless of order is familiar to a person having ordinary skill in the art.

The barrier layers 60-64 may include any material or multilayer combination of materials recognized by a person having ordinary skill in the art. Exemplary materials for barrier layers 60-64 include, but are not limited to titanium (Ti), titanium nitride (TiN), tantalum (Ta), tantalum nitride (TaN), combinations of these materials, and other like materials. The material constituting barrier layers 60-64 may be formed utilizing conventional deposition processes well known to those skilled in the art, including but not limited to PVD, ionized-PVD (iPVD), atomic layer deposition (ALD), CVD, and plasma-assisted CVD.

The conductive plates in the other metallization layers (not shown) may have a construction analogous to the construction of conductive plates 20, 22 and conductive plates 26, 28, or may have a construction analogous to the construction of conductive plates 44, 46.

Additional process steps are performed to provide electrical connections (not shown) to the conductive plates 20, 22, 26, 28, 44, 46 of the VPP capacitor structure 10. Specifically, an electrical connection for use in electrically biasing at least one of the conductive plates 20, 26, 44 with a potential having one polarity (e.g., positive) and another electrical connection for use in electrically biasing at least one of the conductive plates 22, 28, 46 with a potential having the opposite polarity (e.g., negative). The conductive plugs 34, 38, 52, 55 electrically couple conductive plates 20, 22, 26, 28, 44, 46 and, optionally, other overlying and underlying conductive plates (not shown). Similarly, the conductive plugs 36, 40, 54, 56 electrically couple conductive plates 22, 28, 46 and optionally other overlying and underlying conductive plates (not shown). The process steps may be subsumed by the process steps forming the conductive plates 20, 22, 26, 28, 44, 46.

Conductive plates 20, 26, 44 are generally aligned in one vertical column, which is biased with one polarity, and conductive plates 22, 28, 46 are generally aligned in another vertical column, which is biased with the opposite polarity. Conductive plates may be provided in additional columns adjacent to the column containing conductive plates 20, 26, 44 and/or to the column containing conductive plates 22, 28, 46. Independent of the number of columns of conductive plates, the bias potential for the columns alternates between the different polarities so that conductive plates in adjacent columns of the VPP capacitor structure 10 are biased with opposite polarities.

With continued reference to the FIGURE, conductive plates 20, 22, as well as other adjacent pairs of conductive plates (not shown) in metallization layer 14, have confronting sides 70, 72, respectively, spaced apart by first dielectric-filled gap characterized by a first distance, $W_1$. The dielectric material filling the gap originates from insulating layer 24. Similarly, conductive plates 26, 28, as well as other adjacent pairs of conductive plates (not shown) in metallization layer 16, have confronting sides 74, 76, respectively, that are spaced apart by a dielectric-filled gap characterized by a second distance, $W_2$. The dielectric material filling the gap originates from insulating layer 30. Conductive plates 44, 46, as well as other adjacent pairs of conductive plates (not shown) in metallization layer 18, have confronting sides 78, 80, respectively, that are spaced apart by a dielectric-filled gap characterized by a third distance, $W_3$. The dielectric material filling the gap originates from insulating layer 48. The first, second, and third distances are selected to differ from each other so that the conductive plates 20, 22, the conductive plates 26, 28, and the conductive plates 44, 46 are formed with unique pitches. In an alternative embodiment, only two of the first, second, and third distances may differ. Adjacent conductive plates (not shown) in metallization layers (not shown) either overlying or underlying metallization layer 18 may be spaced by distances selected from among the first, second, and third distances, or by one or more additional distances distinct from first, second, and third distances.

Conductive plates 20, 22 may be formed from the same material (e.g., aluminum or aluminum alloy) as conductive plates 26, 28. Alternatively, conductive plates 20, 22 may be formed from a different material (e.g., copper or copper alloy) than conductive plates 26, 28 (e.g., aluminum or aluminum alloy). Similarly, conductive plates 44, 46 may be formed from a different material (e.g., copper or copper alloy) than conductive plates 26, 28 (e.g., aluminum or aluminum alloy) or from the same material as conductive plates 26, 28. Similar considerations apply for the selection of materials forming the conductive plates in overlying and underlying metallization layers (not shown).

Conductive plates 20, 22 in metallization layer 14 may be aligned substantially parallel to each other with top and/or bottom surfaces contained in respective substantially horizontal planes. Similarly, conductive plate 26 may be aligned substantially parallel with conductive plate 28 with top and/or bottom surfaces contained in respective substantially horizontal planes, and conductive plates 44, 46 may be aligned substantially parallel with each other with top and/or bottom surfaces contained in respective substantially horizontal planes. Alternatively, one or more of the horizontal plate alignments in each of the metallization layers 14, 16, 18 may vary from parallel.

In one embodiment, conductive plate 20 in metallization layer 14 directly overlies conductive plate 26 in metallization layer 16 and conductive plate 44 in metallization layer 18. Similarly, conductive plate 22 in metallization layer 14 may directly overlie conductive plate 28 in metallization layer 16 and conductive plate 46 in metallization layer 18. Alternatively, conductive plates 20, 22 may be shifted horizontally relative to conductive plates 26, 28 and/or conductive plates 26, 28 may be shifted horizontally relative to conductive plates 44, 46 so that direct vertical alignment is relaxed, while maintaining the pitch or spacing between adjacent plate pairs in the different metallization layers 14, 16, 18.

In an alternative embodiment, the metallization layers 14, 16, 18 may also contain a multilevel interconnect structure, which is generally indicated by reference numeral 90. The interconnect structure 90, which is formed by the BEOL processes, interconnects the various circuits and/or devices (not shown) formed on substrate 12 by front end of line (FEOL) processes, electrically contacts features on substrate 12, and also provides connections to external contacts (not shown).

Metallization layer 14 may further include a plurality of conductive lines, of which conductive line 92 is representative, that are formed in insulating layer 24 and are clad by portions of barrier layers 60, 61. The underlying metallization layer 16 may also include a plurality of conductive lines, of which conductive line 94 is representative, that are formed in insulating layer 30 and are clad by portions of barrier layers 62, 63. Conductive plugs, such as the representative plug 96, fill vias defined in insulating layer 32 and, thereby, supply vertical connections between the conductive lines 92, 94. Conductive plugs, such as the representative plug 98, fill vias defined in insulating layer 42 and, thereby, supply vertical connections between conductive lines 92 and an optional overlying conductive line (not shown) in an overlying metallization layer.

Metallization layer 18 also includes a plurality of conductive lines, of which conductive line 99 is representative, that are formed in insulating layer 48. The conductive line 99 is isolated from insulating layers 48, 58 by barrier layer 64. Conductive plugs, such as the representative plug 100, fill vias defined in insulating layer 50 to supply vertical connections between the conductive lines 94, 99. Conductive plugs, such as the representative plug 102, fill vias defined in insulating layer 58 and, thereby, supply vertical connections between conductive line 99 and an optional underlying conductive line (not shown) in an underlying metallization layer.

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The term "vertical" refers to a direction perpendicular to the horizontal, as just defined. Terms, such as "on", "above", "below", "side" (as in "sidewall"), "upper", "lower", "over", "beneath", and "under", are defined with respect to the horizontal plane. It is understood that various other frames of reference may be employed for describing the invention without departing from the spirit and scope of the invention.

The fabrication of the semiconductor structure herein has been described by a specific order of fabrication stages and steps. However, it is understood that the order may differ from that described. For example, the order of two or more fabrication steps may be switched relative to the order shown. Moreover, two or more fabrication steps may be conducted either concurrently or with partial concurrence. In addition, various fabrication steps may be omitted and other fabrication steps may be added. It is understood that all such variations are within the scope of the invention. It is also understood that features of the invention are not necessarily shown to scale in the drawings. Furthermore, to the extent that the terms "includes", "having", "has", "with", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A vertical parallel plate capacitor structure comprising:
    a first metallization layer including a first insulating layer, a first conductive-plate, and a second conductive plate, the first and second conductive plates in the first metallization layer laterally spaced apart within the first insulating layer by a first relative distance;
    a second metallization layer including a second insulating layer, a first conductive plate, and a second conductive plate, the first conductive plate in the second metallization level having a directly overlying relationship with the first conductive plate in the first metallization level and the second conductive plate in the second metallization level having a directly overlying relationship with the second conductive plate in the first metallization level, and the first and second conductive plates in the second metallization level laterally spaced apart within the second insulating layer by a second relative distance greater than the first relative distance;
    a third insulating layer between the first metallization level and the second metallization level;
    one or more first conductive plugs physically and electrically coupling the first conductive plate in the first metallization level with the first conductive plate in the second metallization level, the one or more first conductive plugs extending through the third insulating layer from the first conductive plate in the first metallization layer to the first conductive plate in the second metallization layer;
    one or more second conductive plugs physically and electrically coupling the second conductive plate in the first metallization level with the second conductive plate in the second metallization level, the one or more second conductive plugs extending through the third insulating layer from the second conductive plate in the first metallization layer to the second conductive plate in the second metallization layer;
    a first electrical connection with the first and second conductive plates in the first metallization layer, the first electrical connection configured to electrically bias the first and second conductive plates in the first metallization layer with a positive potential; and
    a second electrical connection with the first and second conductive plates in the second metallization layer, the second electrical connection configured to electrically bias the first and second conductive plates in the second metallization level with a negative potential.

2. The vertical parallel plate capacitor structure of claim 1 wherein the first and second conductive plates in the first metallization level are composed of a first material, the first and second conductive plates in the second metallization level are composed of a second material, and the first material is the same as the second material.

3. The vertical parallel plate capacitor structure of claim 1 wherein the first and second conductive plates in the first metallization level are composed of a first material, the first and second conductive plates in the second metallization level are composed of a second material, and the first material is different than the second material.

4. The vertical parallel plate capacitor structure of claim 1 wherein the first and second conductive plates in the first metallization layer are composed of copper, and the first and second conductive plates in the second metallization layer are composed of aluminum.

5. The vertical parallel plate capacitor structure of claim 1 wherein the first and second conductive plates in the first metallization layer are aligned substantially parallel to each other, and the first and second conductive plates in the second metallization layer are aligned substantially parallel to each other.

6. The vertical parallel plate capacitor structure of claim 1 wherein the first and second conductive plates in the first metallization layer are composed of copper, and the first and second conductive plates in the second metallization layer are composed of aluminum.

\* \* \* \* \*